United States Patent
Moores, Jr. et al.

(10) Patent No.: US 6,455,186 B1
(45) Date of Patent: Sep. 24, 2002

(54) BATTERY COOLING SYSTEM

(75) Inventors: Robert G. Moores, Jr., Reisterstown, MD (US); Rouse R. Bailey, Jr., New Park, PA (US); Robert Bradus, Bel Air, MD (US); John R. Cochran, Baltimore, MD (US); Lee W. Ramstrom, Hunt Valley, MD (US); Douglas L. Kreiser, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/035,586

(22) Filed: Mar. 5, 1998
(Under 37 CFR 1.47)

(51) Int. Cl.⁷ .......................... H01M 2/10; H01M 2/12; H01M 10/46; H01M 10/50

(52) U.S. Cl. .......................... 429/71; 429/62; 429/83; 429/120; 429/123; 320/113

(58) Field of Search .............. 429/62, 71, 83, 429/120, 123, 148; 320/113

(56) References Cited

U.S. PATENT DOCUMENTS

| | | | |
|---|---|---|---|
| 1,036,063 A | | 8/1912 | Bedell et al. |
| 1,152,247 A | | 8/1915 | Walker |
| 2,104,772 A | * | 1/1938 | Saunders |
| 3,767,468 A | | 10/1973 | Schusler |
| 4,107,402 A | * | 8/1978 | Dougherty et al. .......... 429/120 |
| 4,517,263 A | | 5/1985 | Reiss et al. |
| 4,522,898 A | | 6/1985 | Esrom |
| 4,847,513 A | | 7/1989 | Katz et al. |
| 5,204,609 A | * | 4/1993 | Alisauki .................... 320/113 |
| 5,229,702 A | | 7/1993 | Boehling et al. |
| 5,447,807 A | * | 9/1995 | Peled et al. .................... 429/62 |
| 5,456,994 A | * | 10/1995 | Mita .............................. 429/71 |
| 5,480,734 A | | 1/1996 | Schulz et al. |
| 5,799,739 A | | 9/1998 | Takaada et al. |
| 5,866,276 A | * | 2/1999 | Ogami et al. ................ 429/120 |
| 6,049,191 A | * | 4/2000 | Terazoe et al. .............. 320/108 |
| 6,066,938 A | * | 5/2000 | Hyodo et al. ................ 320/114 |

FOREIGN PATENT DOCUMENTS

| | | |
|---|---|---|
| DE | 4029018 A1 | 3/1992 |
| DE | 4327391 A1 | 2/1995 |
| EP | 0920105 A2 | 6/1999 |
| JP | 56-88267 | 7/1981 |
| JP | 56-126270 | 10/1981 |
| JP | 56-126271 | 10/1981 |
| JP | 57-156635 | 9/1982 |
| JP | 58-19879 | 2/1983 |
| JP | 58-164150 | 9/1983 |
| JP | 59-92545 | 6/1984 |
| JP | 60-38043 | 3/1985 |
| JP | 60-187456 | 12/1985 |
| JP | 62-119131 | 7/1987 |
| JP | 63-120534 | 8/1988 |
| JP | 63-287331 | 11/1988 |
| JP | 4-236134 | 8/1992 |
| JP | 5-37634 | 9/1993 |
| JP | 5-326024 | 12/1993 |
| JP | 6-150978 | 5/1994 |
| JP | 6-54209 | 7/1994 |
| JP | 7-101297 | 4/1995 |
| JP | 7-322490 | 12/1995 |
| JP | 8-140272 | 5/1996 |
| JP | 09259940 | 2/1997 |
| JP | 9-63656 | 3/1997 |
| JP | 10-3950 | 1/1998 |

* cited by examiner

*Primary Examiner*—Stephen Kalafut
(74) *Attorney, Agent, or Firm*—Harness, Dickey & Pierce, P.L.C.

(57) ABSTRACT

A cordless power tool has a housing which includes a mechanism to couple with a removable battery pack. The battery pack includes one or more battery cells as well as a vent system in the battery pack housing which enables fluid to move through the housing. A mechanism is associated with the battery pack to dissipate heat from the battery pack.

46 Claims, 9 Drawing Sheets

BATTERY COOLING SYSTEM

BACKGROUND OF THE INVENTION

The present invention relates to battery cooling systems and, more specifically, to systems for cooling batteries for cordless power tools.

Cordless products which use rechargeable batteries are prevalent throughout the workplace as well as in the home. From housewares to power tools, rechargeable batteries are used in numerous devices. Ordinarily, nickel-cadmium or nickelmetal-hydride battery cells are used in these devices. Since the devices use a plurality of battery cells, the battery cells are ordinarily packaged as battery packs. These battery packs couple with the cordless devices and secure to the device. The battery pack may be removed from the cordless device and charged in a battery charger or charged in the cordless device itself.

As the cordless power device is used, current flows through the batteries to power the cordless device. As current is drawn off the batteries, heat is generated within the battery pack. Also, during charging of the battery pack, heat is likewise accumulated during the charging process. The heat created during discharge of the batteries as well as charging of the batteries which, in turn, leads to increased temperatures, may have a severe effect on the life expectancy and performance of the batteries. In order for batteries to properly charge, the batteries must be below a desired threshold temperature and the differential temperature between the cells in the battery pack should be minimized. Likewise, if the batteries become too hot during use, battery life will be cut short. Also, if a battery is below a certain threshold temperature, it will be too cold to charge and must be warmed before charging. Thus, it is desirous to maintain batteries within a desired temperature range for optimum performance as well as optimum charging.

Further, battery packs typically contain some battery cells close to the outer walls of the pack, while some battery cells are surrounded by other battery cells. Those cells close to the outer walls have better thermal conductivity to the outside ambient than do the cells that are surrounded by other cells. When a battery pack is discharging on the cordless device, the amount of heat generated is approximately the same in each cell. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to a decline in the performance of the entire pack.

SUMMARY OF THE INVENTION

The present invention provides the art with a battery pack which dissipates heat within the battery pack during charging of the cells as well as discharging of the cells while the battery pack is in use.

In accordance with a first aspect of the invention, a cordless power tool to reduce charging time comprises a housing including a mechanism to couple a removable battery pack. A removable battery pack has a housing with one or more cells in the housing. A vent system is in the housing to enable fluid passage through the housing. A mechanism is associated with the battery pack to dissipate heat in the battery pack housing. This heat removal from the battery pack reduces the battery pack charging time. The heat dissipating mechanism may include fluid directors to move fluid around cells as desired. Also, alternatively, a heat sink may be used to dissipate heat from the cells. Further, alternatively, a fan may be used to force fluid through the vent system to dissipate heat from the battery pack. The fan may be either in the tool housing or in the battery pack.

In accordance with a second aspect of the invention, a cordless power tool to reduce charging time comprises a housing including a mechanism to couple with a removable battery pack. A removable battery pack has a housing with one or more cells in the housing. A vent system is in the housing to enable fluid passage through the housing. A mechanism is associated with the battery pack to dissipate heat from the battery pack. This heat removal from the battery pack reduces the battery pack charging time. The heat dissipating mechanism may include fluid directors to move fluid around the cells with higher temperatures. Further, alternatively, a heat sink may be used to dissipate heat from the cells. Also, alternatively, a fan may be used to force fluid through the vent system to dissipate heat from the battery pack. The fan may be either in the tool housing or in the battery pack. A battery charger to charge the battery pack is also included. The battery charger has a mechanism to move fluid through the vent system of the battery pack housing. The charger may include a fan to force air through the battery pack vent system. Further, the battery pack may include a fan and in this case the charger may include a vent system to enable fluid to pass by the cell or cells in the battery pack housing.

In accordance with a third aspect of the invention, a cordless power tool to reduce charging time comprises a housing including a mechanism to couple with a removable battery pack. A removable battery pack has a housing with one or more cells in the housing. A vent system is in the housing to enable fluid passage through the housing. A mechanism is associated with the battery pack to dissipate heat from the battery pack. This heat removal from the battery pack reduces the battery pack charging time. The heat dissipating mechanism may include fluid directors to move fluid around the battery cells. Also, alternatively, a heat sink may be used to dissipate heat from the battery cells. Further, alternatively, a fan may be used to force fluid through the vent system to dissipate heat from the battery pack. The fan may be either in the tool housing or in the battery pack. Also, a battery charger to charge the battery pack is included. Here, an auxiliary fan is coupled with the charger or battery pack to force air through the charger or battery pack vent systems. The auxiliary fan is capable of moving fluid through the battery pack while the battery pack is secured with the charger.

In accordance with a fourth aspect of the invention, a cordless power tool to reduce charging time comprises a housing including a mechanism to couple with removable battery pack. A removable battery pack has a housing with one or more cells in the housing. A vent system is in the housing to enable fluid passage through the housing. A mechanism is associated with the battery pack to dissipate heat from the battery pack housing. This heat removal from the battery pack reduces the battery pack charging time. The heat dissipating mechanism may include fluid directors to move fluid around the battery cells. Also, alternatively, a heat sink may be used to dissipate heat from the battery cells. Further, alternatively, a fan may be used to force fluid through the vent system to dissipate heat from the battery pack. The fan may be either in the tool housing or in the battery pack. A heat pump is included to provide heating or cooling of the battery cells depending upon the temperature of the battery cells. Thus, the heat pump enables the battery cells to be cooled if they are above a desired temperature and to be heated if the cells are below a desired temperature to enable charging of the cells.

In accordance with a fifth aspect of the invention, a cordless power tool to reduce charging time comprises a housing including a mechanism to couple with a removable battery pack. A removable battery pack has a housing with a plurality of cells in the housing. A vent system is in the housing to enable fluid passage through the housing. A mechanism is associated with the battery pack to dissipate heat or equalize temperatures in the battery pack. The heat removal from the battery pack reduces the battery pack charging time. The heat dissipating mechanism may include fluid directors to move fluid around the cells with higher temperatures. Also, alternatively, a heat sink may be used to dissipate heat from the higher temperature cells. Further, alternatively, a fan may be used to force fluid through the vent system to dissipate heat from the battery pack. The fan may be either in the tool housing or in the battery pack. A sensing mechanism may be included to sense the temperature of the plurality of cells in the battery pack housing. The heat dissipator equalizes the temperature of the plurality of cells. The heat dissipator wicks heat from the hotter cells to ambient or to the other cells to equalize cell temperature within the housing.

In accordance with a sixth aspect of the invention, a removable battery pack has a housing with one or more cells in the housing. A vent system is in the housing to enable fluid passage through the housing. A mechanism is associated with the battery pack to dissipate heat from the battery pack. This heat removal from the battery pack reduces the battery pack charging time. The heat dissipating mechanism may include fluid directors to move fluid around cells. Also, alternatively, a heat sink may be used to dissipate heat from the cells. Further, alternatively, a fan may be used to force fluid through the vent system to dissipate heat from the battery pack. The fan may be either in the tool housing or in the battery pack.

In accordance with a seventh aspect of the invention, a cordless power tool comprises a housing which includes a mechanism to couple with a removable battery pack. A removable battery pack includes a housing with one or more cells in the housing. A mechanism is in the battery pack housing coupled with the plurality of cells to equalize temperature of the plurality of cells. The mechanism may be a heat sink to equalize temperature of the cells in the housing. The heat sink may include an increased concentration of material in areas having higher temperature cells. Also, the heat sink may include a thermally conductive electrically insulating medium surrounding the cells, a base, and fins. Also, the battery pack may include apertures for dissipating heat.

In accordance with further aspects of the invention, several of the above features may be combined with one another to provide additional advantages.

Additional objects and advantages of the invention will become apparent from the detailed description of the preferred embodiment, and the appended claims and accompanying drawings, or may be learned by practice of the invention.

BRIEF DESCRIPTION OF THE DRAWINGS

The accompanying drawings, which are incorporated in and constitute a part of the specification, illustrate an embodiment of the invention and together with the description serve to explain the principles of the invention. In the drawings, the same reference numerals indicate the same parts.

DETAILED DESCRIPTION OF THE PREFERRED EMBODIMENT

Figure 1:
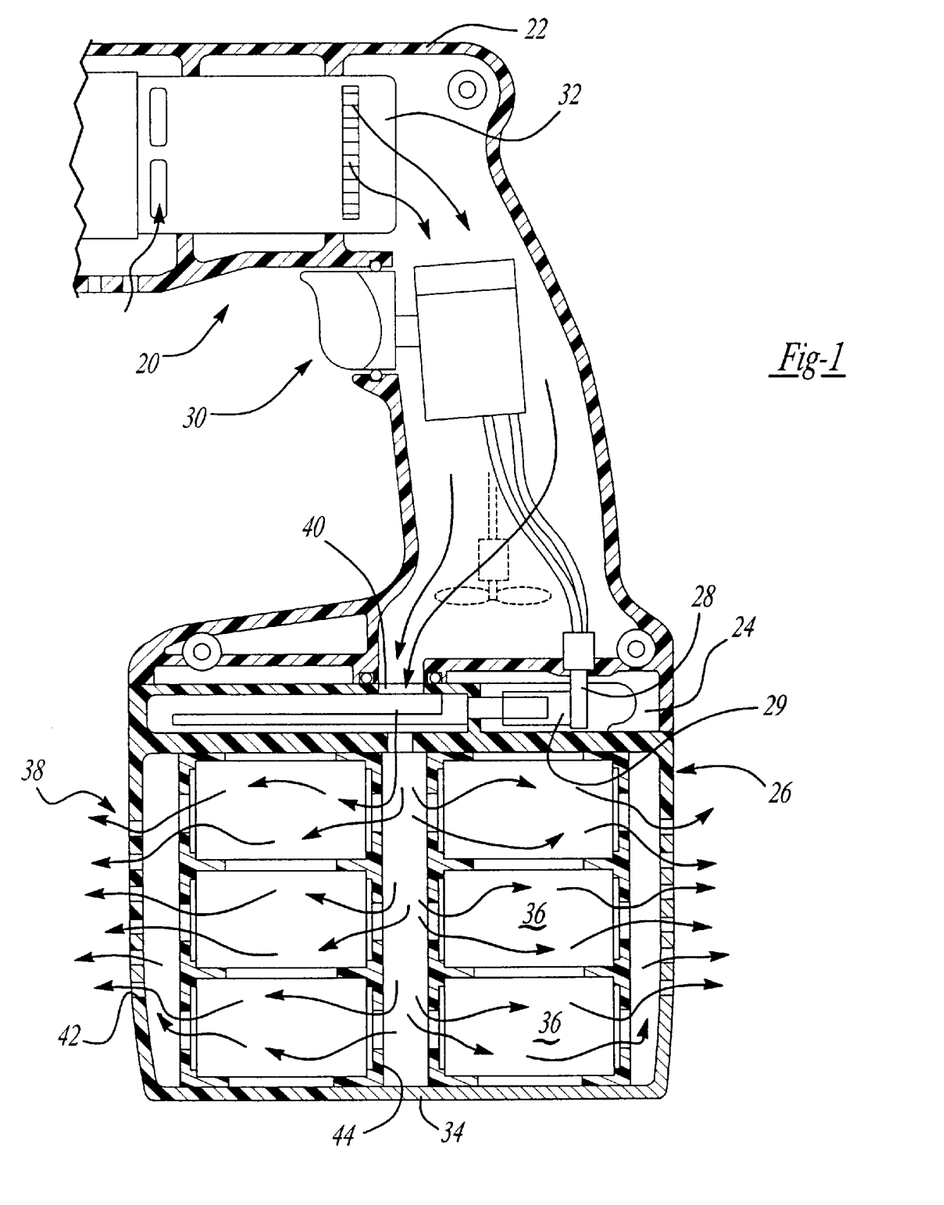
FIG. 1 is a partial cross-section view of a cordless power tool and battery in accordance with the present invention.

Turning to the figures, a cordless device is illustrated and designated with the reference numeral 20. The cordless device ordinarily includes a clamshell type housing 22. The housing 22 includes a mechanism 24 to couple with a portion of a battery pack 26. The cordless device 20 includes electrical elements 28 which couple with the battery pack electrical elements 29. Also, the device includes a trigger 30 which energizes the motor 32 within the housing 22.

The battery pack 26 includes a housing 34 which contains a plurality of battery cells 36 within the housing 34. Also, the housing 34 includes a ventilation system 38 which enables fluid to pass through the housing 34 and move around the cells 36 to dissipate heat from the plurality of cells 36 to the ambient air. The venting system 38 ordinarily includes at least one inlet 40 and at least one outlet 42. The inlet and outlet are ordinarily apertures or slots in the housing 34. Also, a channel 44 is formed within the housing 26 and aligned with the inlet 40 to distribute the fluid flow around the battery cells 36 so that all of the battery cells 36 are cooled. Preferably, the fluid flows coaxially with respect to the axes of the batteries 36. Thus, as fluid enters into the channel 44, the fluid is directed over the battery cells and does not pass over one cell to the next cell, etc., but is passed over a number of cells at one time so that the fluid passing through the housing is not warmed by the first cell and then passed over the second cell. However, fluid could be passed over the battery cells transversely with respect to the battery cells axes.

Figure 2:
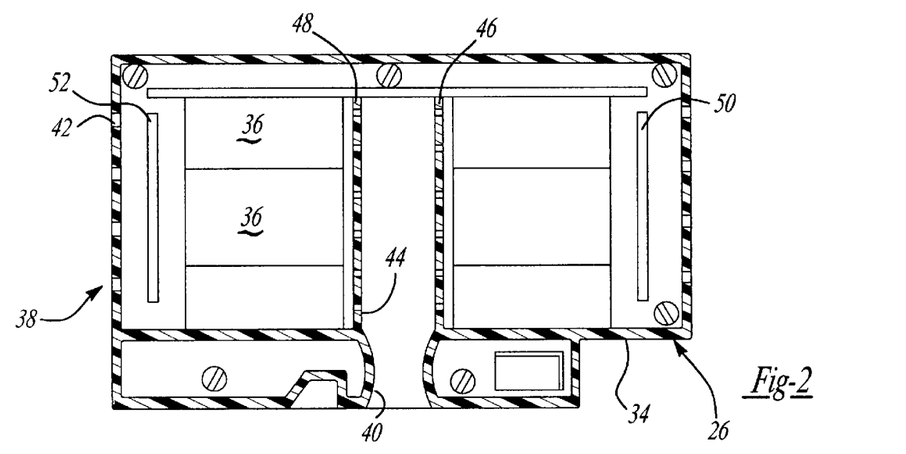
FIG. 2 is a partial cross-section view of a battery pack in accordance with the present invention.

Turning to FIG. 2, an additional embodiment of a battery pack is shown. The battery pack 26 is like that illustrated in FIG. 1, including the housing 34, ventilation system 38 with inlet 40 and outlet 42. Also, cells 36 are positioned within the housing. Additionally, the battery pack includes one or more baffles 46, 48, 50 and 52. The baffles direct the fluid to specific battery cells 36. Ordinarily, the fluid is passed into channel 44 and distributed through the baffles 46 and 48.

Figure 3:
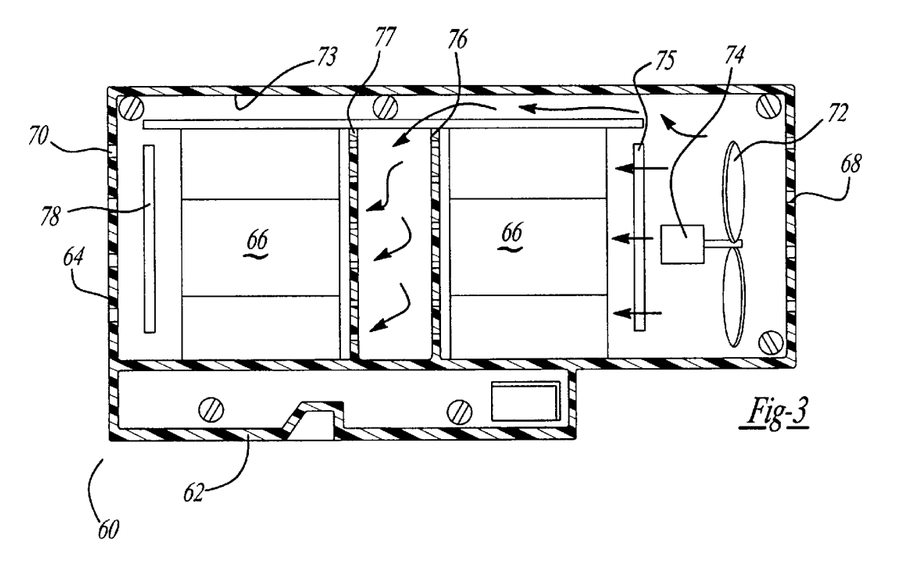
FIG. 3 is a cross-section view of another embodiment of a battery pack in accordance with the present invention.

Turning to FIG. 3, an additional embodiment of a battery pack is shown. Battery pack 60 includes a housing 62 with a venting system 64 which enables fluid to pass around the battery cells 66. The ventilation system 64 includes at least one inlet 68 and at least one outlet 70. Also, the battery housing includes a fan 72. The fan 72 may include a motor 74 which may run off of the battery cells 66. Also, the fan motor 74 may run off of a charging circuit when the battery pack is in a charger. The fan 72 moves fluid through the battery pack inlet. The fluid is forced over the battery cells 66 and out the outlets 70. Thus, a positive pressure is created in the battery pack as fluid flows through the battery pack 60. However, a negative pressure could be created in the battery pack sucking fluid through the battery pack. The channels 73 direct the fluid through the battery cells so that the fluid does not continue to pass from cell to cell but passes over different cells so that the cells experience the air at about the same temperature.

Also, the battery housing may include baffles 75, 76, 77, 78 like those described above.

Further, an auxiliary fan could be positioned in the tool housing itself as illustrated in phantom in FIG. 1 to move fluid through the battery housing. Temperature sensors may be positioned in the housing to monitor individual battery cell temperature. Also, the baffles may be designed to direct fluid flow to the hottest battery cells. Thus, the cells would be cooled as well as the temperature being equalized.

Figures 4A, 4B:
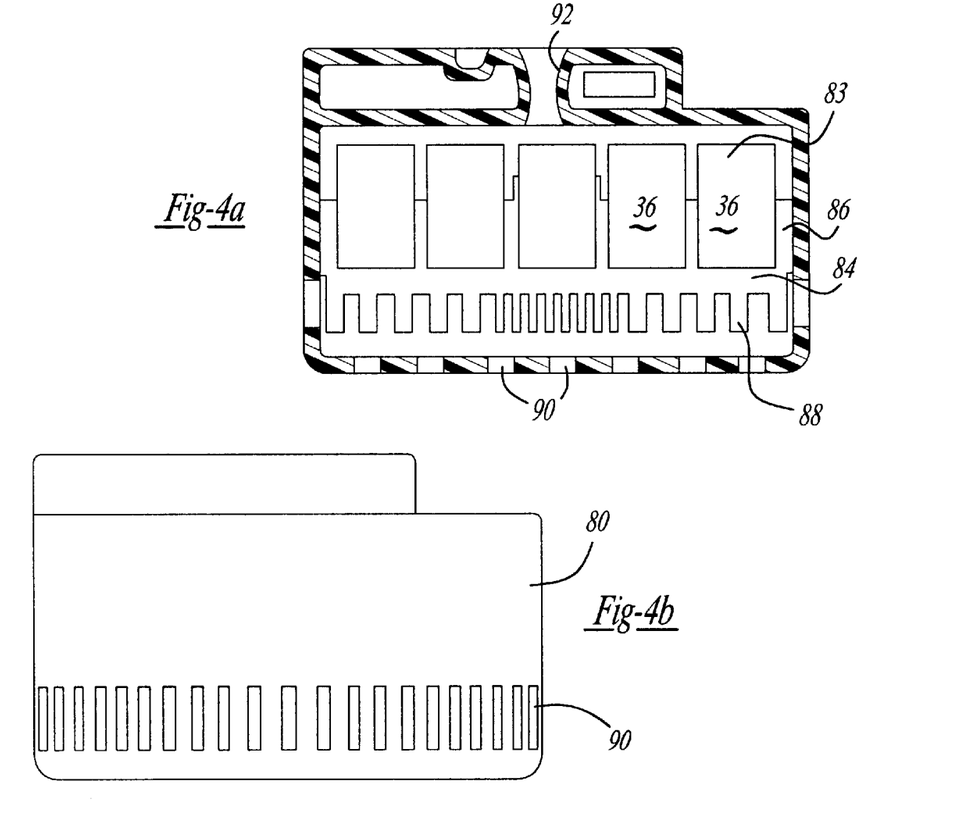
FIG. 4A is a cross-section view of another battery pack in accordance with the present invention.
FIG. 4B is an elevation view of the battery pack of FIG. 4A.

Turning to FIGS. 4A and 4B, an additional embodiment of the present invention is illustrated. Here, the battery pack includes a housing 80, a plurality of cells 36 which are wrapped in a thermally conductive but electrically insulating substance 83 to remove heat from the battery pack. Also, a heat sink 84 is positioned between the cells for wicking the heat from the battery cells 36. Projecting portions 86 surround the batteries to effectively move heat towards the fins 88 of the heat sink 84. Also, a plurality of slots 90 are formed in the housing 80 to enable the heat to be removed from the battery cells 36. The heat sink 84 may be any type of metallic sink with the projecting portion 82 either being metallic or a thermally conductive medium, such as potting compound, gels or grease to extract the heat from the cells to the heat sink 84. The heat exits through the fins 88. Also, more fins, as well as larger projecting portions, surround battery cells which are known to have higher temperatures during charging of the battery as well as discharging when the tool is used. Thus, heat is drawn from the battery cells 36 to the heat sink. The ventilation slots 90 enable fluid to pass over the fins 88 to remove heat. Also, an inlet 92 may be included in the housing to enable fluid to pass from a fan in the tool housing through the battery pack.

Figure 4C:
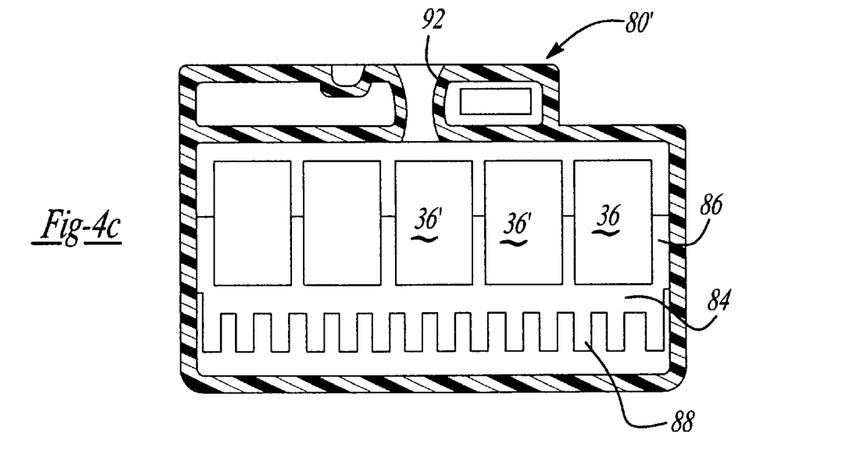
FIG. 4C is a cross-section view of another battery pack in accordance with the present invention.

FIG. 4C illustrates an additional embodiment of the present invention. The battery pack is similar to that in FIGS. 4A and 4B, except the housing 80' does not include the plurality of slots. The plurality of cells 36 are wrapped in a thermally conductive but electrically insulating substance such as tape 83 to enable heat to move from battery to battery via a heat sink 84. The heat sink 84 is positioned between the cells to wick heat from hotter battery cells and transfer the heat to battery cells having a lower temperature so that the temperatures of the cells are equalized within the pack. Projecting portions 86 surround the battery cells to effectively remove heat towards the fins of the heat sink 84. Cells which are known to have higher temperatures are designated with 36'. Further, the heat sink may be a metallic type like that mentioned above, or may include thermally conductive mediums such as potting compound, gels or grease to extract heat from hotter cells and move it to the heat sink which, in turn, distributes the heat to the remaining cells such that the temperature within the cells is equalized. Thus, the temperature equalization of the cells enables the cells to be charged and discharged at a substantially equal rate which improves and increases the life of the battery pack.

Figure 5:
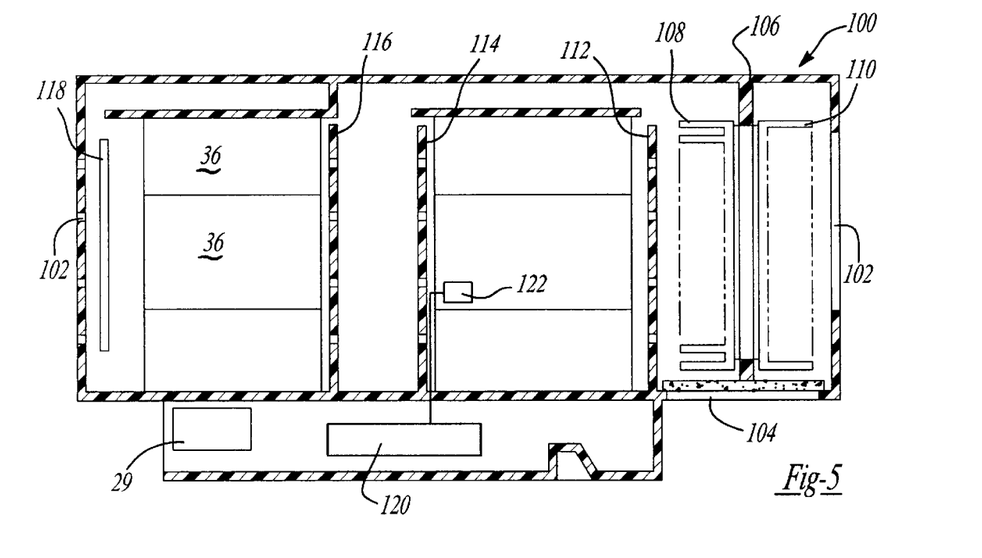
FIG. 5 is another cross-section view of a battery pack in accordance with the present invention.

Turning to FIG. 5, an additional embodiment is illustrated. In FIG. 5, the battery pack includes a housing 100 surrounding a plurality of cells 36. The housing 100 includes a plurality of slots 102 which act as outlets and an inlet 104. Also, a heat pump 106 is positioned within the housing 100. The heat pump 100 is a Peltier device, which is commonly known in the art. The Peltier device is coupled with heat sinks 108 and 110, As the Peltier device is activated, one heat sink becomes cold while the other becomes hot. If the current through the Peltier device is reversed, the cold and hot sides reverse. Thus, the heat sinks 108, 110 can be used to provide cool air into the battery housing 100 and enable the air to be baffled by baffles 112, 114, 116 and 118 to pass over the battery cells 36 and exit the housing through the outlet slots. Thus, cool air would be passed into the housing to cool the batteries. In the event that the battery cells are cold, the Peltier device current could be reversed wherein heated fluid would be passed through the battery pack to warm the battery cells so that they could be charged. The Peltier device is coupled to electronics 120 which may function off of the battery cells, a charger, or both, to control the cooling or heating. Also, a temperature sensor 122 may be positioned in the housing, with respect to the battery cells, so that heating and cooling may take place as desired.

Figure 6:
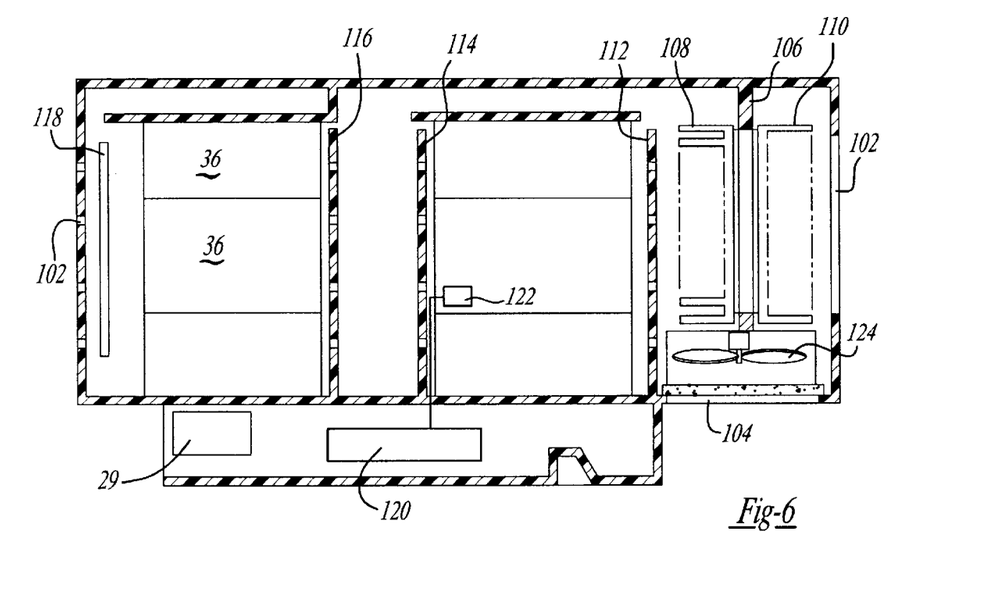
FIG. 6 is an additional cross-section view of another embodiment of a battery pack in accordance with the present invention.

FIG. 6 is a view like that of FIG. 5 including the heat pump 106. Additionally, a fan 124 is positioned within the housing to move the fluid through the battery pack 100. Here, fluid can be channeled throughout the battery enabling the battery to be cooled.

Figure 7:
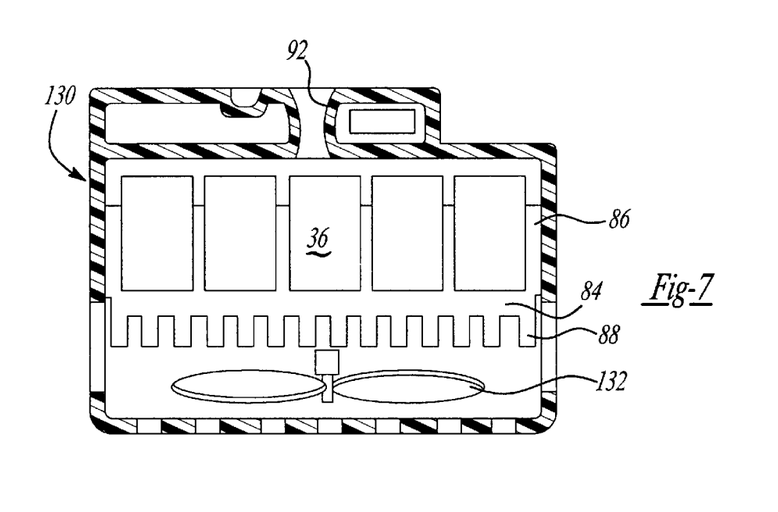
FIG. 7 is an additional cross-section view of a battery pack in accordance with the present invention.

Turning to FIG. 7, a battery pack is illustrated and designated with the reference numeral 130. Here, the battery pack is similar to that illustrated in FIG. 4, however, a fan 132 is positioned within the battery pack. The fan 132 moves fluid across the fins 88 in an attempt to expel the heat from the battery pack housing 130.

Figure 8:
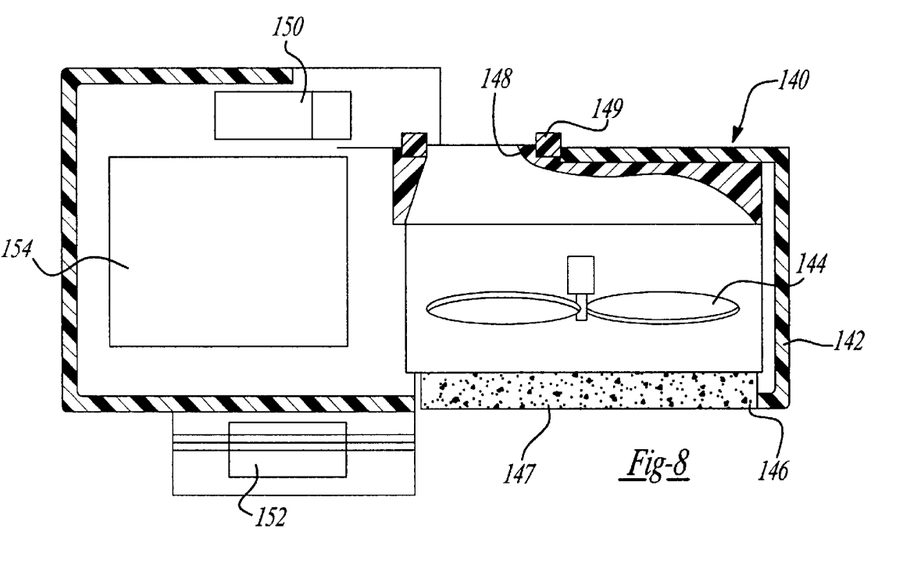
FIG. 8 is a cross-section view of an auxiliary fan module in accordance with the present invention.

Turning to FIG. 8, an auxiliary fan module is illustrated and designated the reference numeral 140. The auxiliary fan module 140 includes a housing 142 which houses a fan 144. The housing includes an inlet 146 with a filer 147 as well as an outlet 148. Fluid flows through the outlet 148, which is surrounded by seal 149, into the battery pack inlet 40 like that illustrated in FIGS. 1, 2. Electrical contacts 150 are positioned within the housing 142 to couple with the battery electrical contacts 29 to charge the battery cells 36. Further, electrical contacts 152 are secured with the housing 142 to mate with electrical contacts in a charger to run the fan during charging of the battery cells. Further, an electronic package 154 is within the housing 142 to control charging of the battery as well as operation of the fan 144. The electronic package 154 may be coupled with the temperature sensor to operate the fan as needed.

Figures 9, 10:
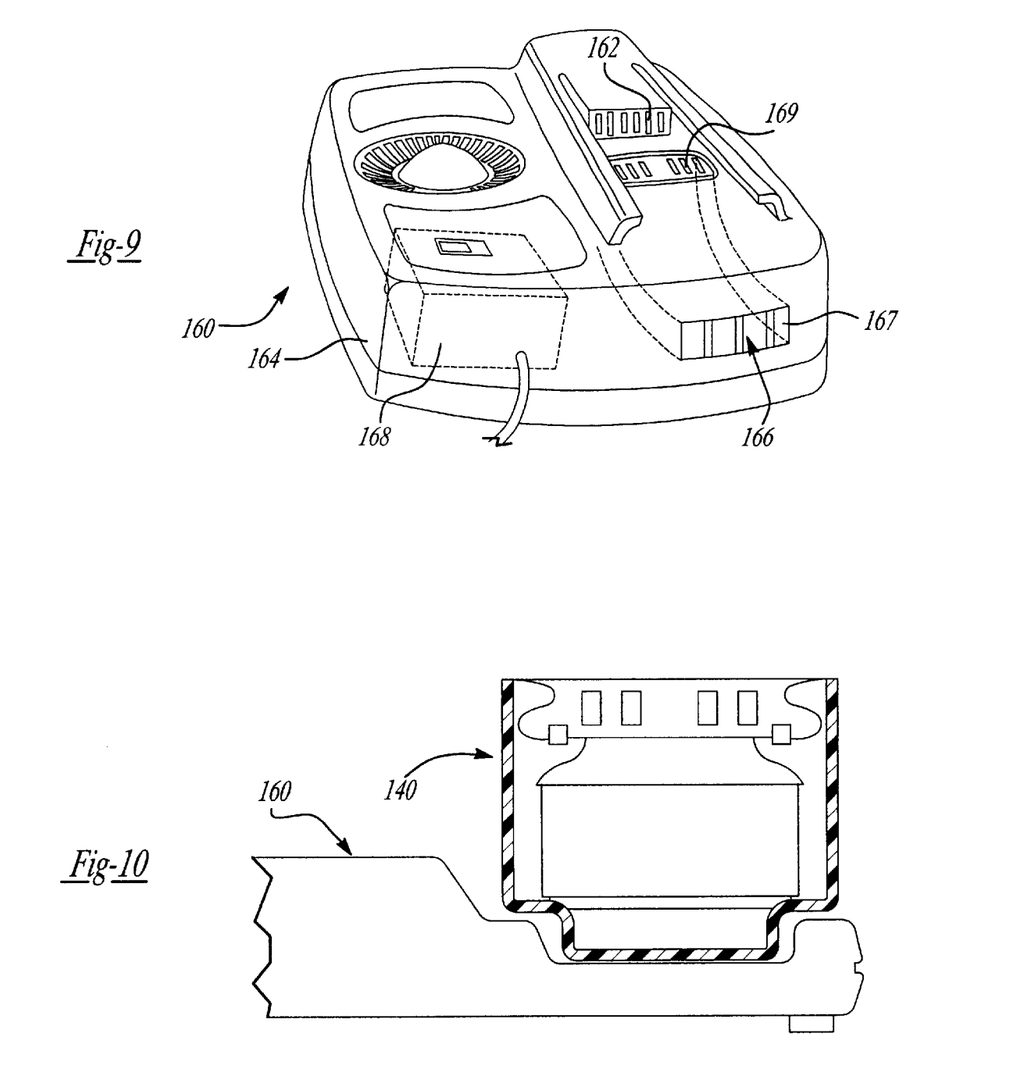
FIG. 9 is a perspective view of a charger in accordance with the present invention.
FIG. 10 is a cross-section view of the auxiliary fan module coupled with the charger of FIG. 9 in accordance with the present invention.

Turning to FIG. 9, a perspective view of a battery charger is illustrated and designated with the reference numeral 160. The charger 160 includes contacts 162 to couple with a battery pack or auxiliary fan module to charge a battery pack. The charger 160 includes a base 164 which includes the electrical contacts coupled with the base. Further a vent system 166, with inlet 167 and outlet 169, is coupled with the base 164 to enable air to pass into and through the battery charger and in turn the battery pack. Further, the battery charger includes an electronics package 168 which receives the current from an AC source and converts it into the DC source required to charge the battery pack.

The charger 160 may be utilized with the disclosed battery packs with or without fans in the battery pack. In the event a battery pack is used which does not include a fan, convection would be used to enable air flow through the vent system 160 and in turn through the battery pack. In a situation where the battery pack includes a fan, the contacts 162 would also couple with the fan electronics within the battery pack to for operating the fan. In this event, the electronics in the charger would electrically couple with the fan electronics to turn on and turn off the fan when needed.

Also, the charger could be utilized with the auxiliary fan module 140 as illustrated in FIG. 10. Here, the auxiliary fan module 140 is coupled with the electrical contacts 162 in the charger 160 to operate the fan 144 within the auxiliary fan module 140. Accordingly, the fan 144 may be turned on and off as desired.

Figure 11:
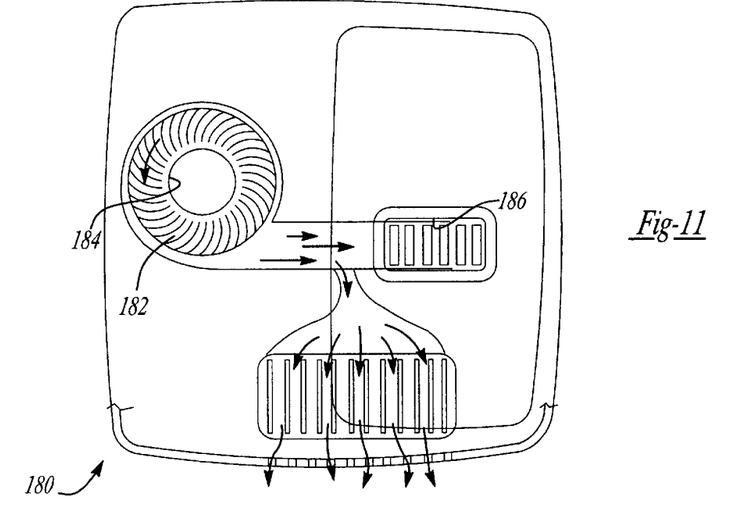
FIG. 11 is a cross-section view of another embodiment of the present invention of a charger of FIG. 9.

Turning to FIG. 11, a charger 180 is shown. The charger 180 is similar to the battery charger 160 except that the battery charger 180 includes a fan 182 coupled with the venting system 166. The fan 182 moves fluid through an inlet 184 and forces the fluid through an outlet 186 into the battery pack. In this type of charger 180, the fan 182 would be activated as desired. Further, the charger electronics could be coupled with a sensor inside of the battery pack which would be activated through the electrical contacts 162. The sensor would sense the temperature within the battery pack so that the fan could run intermittently. Also, the sensors may be removed and the fan would just run constantly while the charger is operating.

Figure 12:
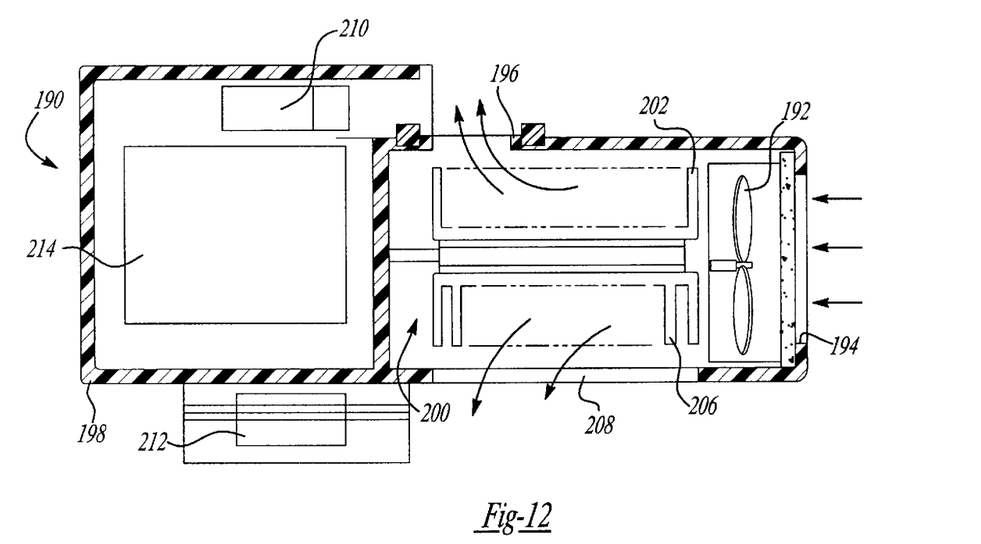
FIG. 12 is a cross-section view like that of FIG. 8 of another embodiment of an auxiliary fan in accordance with the present invention.

Turning to FIG. 12, an auxiliary fan module is illustrated like that in FIG. 8. Here, the auxiliary fan module 190 includes a fan 192, an inlet 194 and an outlet 196 in the housing 198. Also, a heat pump 200 as described above is positioned within the housing 198. The heat pump would produce a cold heat sink 202 which would enable fluid to move in to the housing, via the fan, and pass over the cold heat sink and into the battery pack. The fluid would also pass over the hot side of the heat sink 206, withdrawing heat from the housing, and exhausting the air to ambient through outlet 208. In the event the battery pack is cold, the heat pump 200 may be reversed and heat may be passed into the battery pack to warm the battery pack before charging. The fan module 190 also includes electrical contacts 210 to couple with the battery pack. Also, electrical contacts 212 couple with the charger 160. The electronics 214 within the auxiliary fan module 190 couple with the charger and operate the fan to move fluid into the battery pack as desired.

Figure 13:
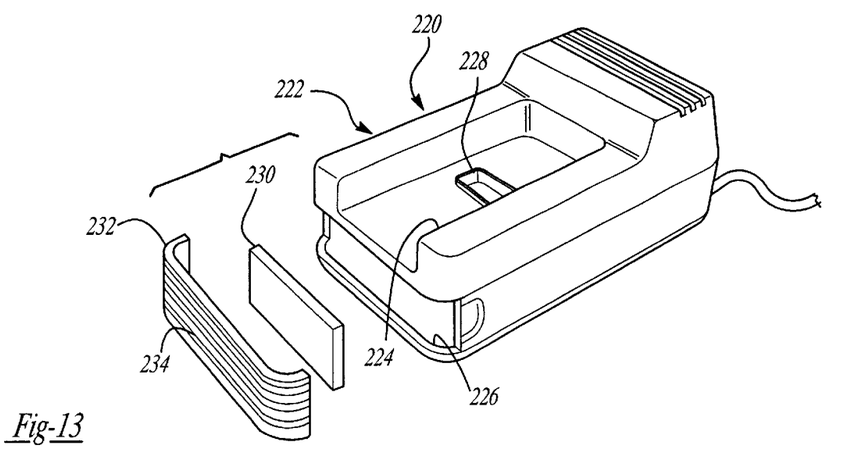
FIG. 13 is a perspective view of a battery cooler/heater in accordance with the present invention.
Figure 14:
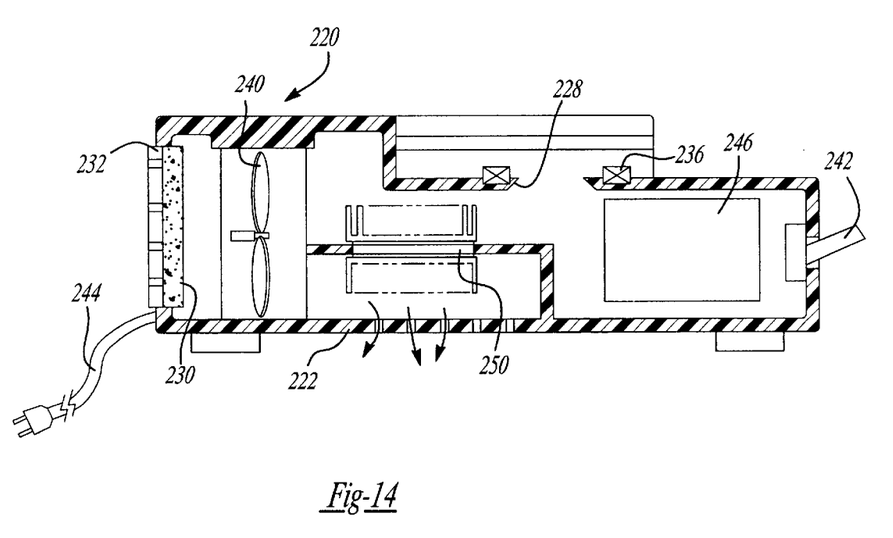
FIG. 14 is a longitudinal cross-section view of FIG. 13.
Figure 15:
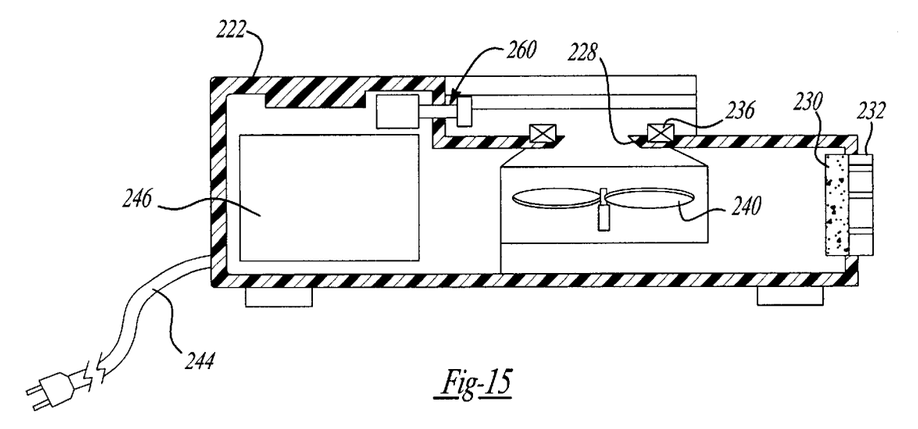
FIG. 15 is a view like FIG. 14 of an additional embodiment of the battery cooler/heater.

Turning to FIGS. 13–15, additional embodiments of the present invention are shown. FIG. 13 illustrates a perspective view of a battery cooler/heater device. Here, the battery cooler/heater 220 includes a housing 222. The housing 222 includes a battery receiving portion 224. The battery receiving portion 224 may be a cutout or the like in the battery housing 222 forming a depression to receive a battery housing pack. Further, the housing includes an inlet 226 and an outlet 228. The inlet enables fluid to pass into a duct in the housing 222 while the outlet enables the fluid to be passed out of the housing duct and into a battery pack. The inlet 226 is generally covered by a filter 230 and a grill 232 is attached to the housing 222 sandwiching the filter between the inlet and the grill 232. The grill 232 has slots 234 to enable air to pass through the grill into the filter and turn through the inlet 226.

An O-ring or some type of seal 236 is positioned around the outlet 228 as shown in FIG. 14. The seal 236 mates with the battery pack to prohibit fluid from escaping around the battery pack housing while fluid is passed into the battery pack housing.

In FIG. 14, the housing 222 includes a fan 240 to move fluid between the inlet 226 and outlet 228. The fan 240 is energized and de-energized by a switch 242. In FIG. 14, the switch 242 is a manual switch enabling the user to manually turn on and turn off the fan 240 as desired. Also, a power cord 244 is coupled with the fan and switch electronics 246 to provide power to the battery cooler/heater 220.

Additionally, a Peltier device 250 (illustrated in phantom) may be positioned near the inlet which may provide cooled or heated fluid which is drawn into the battery pack as described above. The Peltier device 250 would be coupled with the electronics 246 so that the Peltier device 250 may deliver cold or hot fluid flow, depending upon if cooling or heating is desired, to the battery cells.

Turning to FIG. 15, an additional embodiment of the battery heater/cooler 220 is shown. Here, the battery cooler is like that described above, except that an automatic switch 260 has replaced the manual switch 242. Here, as the battery pack housing is slid into the battery cooler/heater housing, the battery contacts the normally open switch 260 energizing the fan 240. As the battery pack housing is withdrawn from the battery cooler/heater, the switch 260 would return to its normally open position, de-energizing the fan.

While the above detailed description describes the preferred embodiment of the present invention, the invention is susceptible to modification, variation, and alteration without deviating from the scope and fair meaning of the subjoined claims.

What is claimed is:

1. A cordless power tool comprising:
   the cordless power tool having a housing including a mechanism for coupling with a removable battery pack;
   said removable battery pack comprising a housing with one or more cells in said housing, a vent system in said battery pack housing for enabling fluid passage through said housing when said cordless power tool is in use; and
   a mechanism associated with said battery pack for dissipating heat from said battery pack.

2. The cordless tool according to claim 1, wherein said mechanism includes fluid directors for moving fluid to said one or more cells.

3. The cordless tool according to claim 1, wherein said mechanism includes a heat sink for dissipating heat from said one or more cells.

4. The cordless tool according to claim 1, wherein said mechanism includes a fan for forcing fluid through said vent system to dissipate heat from the battery pack housing.

5. The cordless tool according to claim 4, wherein said fan is in said tool housing.

6. The cordless tool according to claim 4, wherein said fan is in said battery pack housing.

7. The cordless tool according to claim 1, further comprising a battery charger for charging said battery pack, said battery recharger having a mechanism for moving fluid through said vent system of said battery pack housing.

8. The cordless tool according to claim 7, wherein said charger includes a fan for forcing fluid through said vent system.

9. The cordless tool according to claim 7, wherein said battery pack housing has a fan and said charger has a vent system enabling fluid to be passed through said battery pack vent system.

10. The cordless tool according to claim 7, wherein said charger includes a vent system and an auxiliary fan is coupled with said charger or battery pack housing for moving fluid through said battery pack housing.

11. The cordless tool according to claim 1, further including a heat pump for providing cooling and heating of said one or more cells in said battery pack housing.

12. The cordless tool according to claim 1, wherein said mechanism includes a sensor for sensing temperature of said one or more cells and a heat dissipator for equalizing the temperature of said plurality of cells.

13. The cordless tool according to claim 12, said heat dissipator wicks heat from hotter cells to ambient or to other cells to equalize cell temperature.

14. The cordless tool according to claim 1, wherein said mechanism includes fluid directors for moving fluid around higher temperature cells of said one or more cells and a heat sink for dissipating heat from higher temperature cells of said one or more cells.

15. The cordless tool according to claim 1, wherein said mechanism includes fluid directors for moving fluid around higher temperature cells of said plurality of cells and a fan for forcing fluid through said vent system to dissipate heat from the battery pack housing.

16. The cordless tool according to claim 1, wherein said mechanism includes a heat sink for dissipating heat from higher temperature cells of said one or more cells and a fan for forcing fluid through said vent system to dissipate heat from the battery pack housing.

17. The cordless tool according to claim 15, wherein said fan is in said tool housing.

18. The cordless tool according to claim 16, wherein said fan is in said tool housing.

19. The cordless tool according to claim 15, wherein said fan is in said battery pack housing.

20. The cordless tool according to claim 16, wherein said fan is in said battery pack housing.

21. The cordless tool according to claim 14, further comprising a battery charger for charging said battery pack, said battery charger having a mechanism for moving fluid through said vent system of said battery pack housing.

22. The cordless tool according to claim 21, wherein said charger includes a fan for forcing fluid through said vent system.

23. The cordless tool according to claim 14, wherein said battery pack housing has a fan and said charger has a vent system enabling fluid to be passed by said one or more cells.

24. The cordless tool according to claim 14, wherein said charger includes a vent system and an auxiliary fan is coupled with said charger or battery pack housing for moving fluid through said battery pack.

25. The cordless tool according to claim 15, further comprising a battery charger for charging said battery pack, said battery charger having a mechanism for moving fluid through said vent system of said battery pack housing.

26. The cordless tool according to claim 16, further comprising a battery charger for charging said battery pack, said battery charger having a mechanism for moving fluid through said vent system of said battery pack housing.

27. An auxiliary fluid mover for cooling a rechargeable battery pack, comprising:
   a housing;
   a mechanism for electrically coupling with a battery pack, said mechanism coupled with said housing;
   a mechanism for electrically coupling with a charger, said mechanism coupled with said housing;
   a vent system for directing fluid to a battery pack; and
   a mechanism for moving fluid through said housing into a battery pack.

28. The auxiliary fluid mover according to claim 27, further including a heat pump for providing cooling and heating of said one or more cells in said battery pack housing.

29. The auxiliary fluid mover according to claim 27, wherein said mechanism includes a fan for forcing fluid through said vent system to dissipate heat from the battery pack housing.

30. The auxiliary fluid mover according to claim 28, wherein said mechanism includes a fan for forcing fluid through said vent system to dissipate heat from the battery pack housing.

31. A cordless power tool comprising:
   the cordless power tool having a mechanism for coupling with a removable battery pack;
   said removable battery pack comprising a housing with a plurality of cells in said housing; and
   a mechanism in said housing coupled with said plurality of cells for equalizing temperature of said plurality of cells when said cordless power tool is in use.

32. The cordless tool according to claim 31, wherein said mechanism coupled with said cells including a heat sink for equalizing temperature of said cells in said housing.

33. The cordless tool according to claim 32, wherein said heat sink having an increased capacity to dissipate heat in area having higher temperature cells.

34. The cordless tool according to claim 33, wherein said heat sink includes a thermal conductive medium surrounding said cells, a base, and fins.

35. The cordless tool according to claim 32, wherein said battery pack housing includes apertures for dissipating heat.

36. A cordless power tool comprising:
   a cordless power tool having a mechanism for coupling with a removable battery pack;
   said removable battery pack comprising a housing with a plurality of cells in said housing; and
   a mechanism in said housing coupled with said plurality of cells for equalizing temperature of said plurality of cells when said cordless power tool is in use.

37. The cordless power tool according to claim 36, wherein said mechanism coupled with said cells including a heat sink for equalizing temperature of said cells in said housing.

38. The cordless power tool according to claim 37, wherein said heat sink is increased in area having higher temperature cells.

39. The cordless power tool according to claim 38, wherein said heat sink includes a thermal conductive medium surrounding said cells, a base, and fins.

40. The cordless power tool according to claim 37, wherein said battery pack housing includes apertures for dissipating heat.

41. A battery pack temperature change mechanism comprising:
   a housing;
   a mechanism in the housing for moving fluid through a vent system of a battery pack; and
   a power source coupled with said fluid moving mechanism; and
   a switch for activating the fluid moving mechanism wherein only upon activation of said switch is fluid passed through said housing such that the battery pack is heated or cooled.

42. The battery pack temperature change mechanism according to claim 41, wherein said fluid moving mechanism includes a fan for forcing fluid through said vent system.

43. The battery pack temperature change mechanism according to claim 41, wherein said fluid moving mechanism includes a vent system in said housing.

44. The battery pack temperature change mechanism according to claim 41, wherein said switch is manually activated.

45. The battery pack temperature change mechanism according to claim 41, wherein said switch is automatically activated when said battery pack is coupled with said housing.

46. A cordless power tool comprising:
   a cordless power tool having a housing including a mechanism for coupling with a removable battery pack;
   said removable battery pack comprising a housing with one or more cells in said housing, a vent system in said battery pack housing for enabling fluid passage through said housing; and
   a mechanism associated with said battery pack for dissipating heat from said battery pack, said mechanism includes a heat sink for dissipating heat from said one or more cells.

* * * * *